United States Patent [19]

Glenn et al.

[11] Patent Number: 4,807,950

[45] Date of Patent: Feb. 28, 1989

[54] METHOD FOR IMPRESSING GRATINGS WITHIN FIBER OPTICS

[75] Inventors: William H. Glenn, Vernon; Gerald Meltz, Avon, both of Conn.; Elias Snitzer, Wellesley, Mass.

[73] Assignee: United Technologies Corporation, Hartford, Conn.

[21] Appl. No.: 122,830

[22] Filed: Nov. 19, 1987

Related U.S. Application Data

[60] Division of Ser. No. 925,512, Oct. 27, 1986, Pat. No. 4,725,110, which is a continuation of Ser. No. 640,489, Aug. 13, 1984, abandoned.

[51] Int. Cl.$^4$ .................................................. G02F 1/01
[52] U.S. Cl. .................................. 350/3.61; 350/96.19
[58] Field of Search ..................... 350/3.61, 3.7, 96.11, 350/96.19, 3.65

[56] References Cited

U.S. PATENT DOCUMENTS 4,400,056 8/1983 Cielo ............................... 350/96.19

FOREIGN PATENT DOCUMENTS 55-110207 8/1980 Japan.

OTHER PUBLICATIONS

Kawasaki et al., "Narrow-Band Bragg Reflectors in Optical Fibers", *Optics Letters*, vol. 3, No. 2, Aug. 1978.

*Primary Examiner*—Bruce Y. Arnold
*Assistant Examiner*—Martin Lerner
*Attorney, Agent, or Firm*—Peter R. Ruzek

[57] ABSTRACT

An optical fiber has a dielectric periodic index of refraction phase grating established in its core by intense angled application of several transverse beams of ultraviolet light, enabling the establishment of a distributed, spatially resolving optical fiber strain gauge.

5 Claims, 3 Drawing Sheets

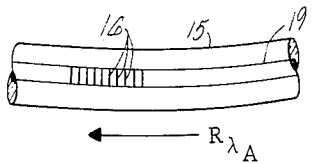
FIG.2A
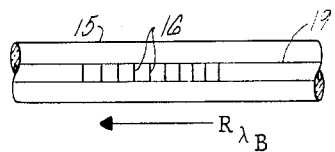
FIG.2B
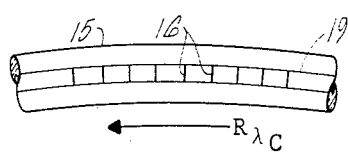
FIG.2C
FIG.3
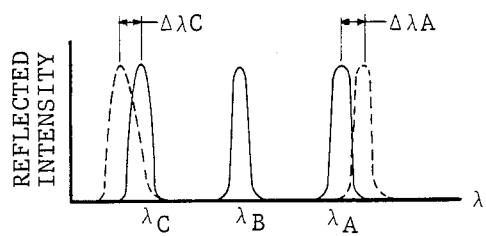

METHOD FOR IMPRESSING GRATINGS WITHIN FIBER OPTICS

This is a division of application Ser. No. 925,512 filed on Oct. 27, 1986 which was a continuation application of U.S. Ser. No. 640,489, filed Aug. 13, 1984, now abandoned.

TECHNICAL FIELD

This invention relates to impressing, establishing, printing or writing phase gratings in optical fibers or waveguides and the optical detection and measurement of strain distributions with multi-wavelength light provided to said phase gratings.

BACKGROUND OF THE INVENTION

It is known to determine the distribution of axial strain or temperature along the length of a fiber optic sensor according to the technique described by S. K. Yao et al. in 21 Applied Optics (1982) pages 3059–3060. According to this technique, very small deformations at the interface between an optical core and its cladding will cause light measurably to couple from core to cladding modes. This permits measurements by time-domain reflectometry or a series of cladding taps to determine transmission loss and the distribution of applied perturbations.

DISCLOSURE OF INVENTION

According to the invention, phase gratings are impressed along the core of an optical waveguide by the application of intense beams of ultraviolet light transverse to the axis of the core at selected angles of incidence and the complements thereto.

BRIEF DESCRIPTION OF THE DRAWINGS

FIGS. 2A through 2C are partial schematics of selected sections of the optical waveguide including its cores, indicating grating patterns of varying spacing corresponding to selected regions A, B and C in a mechanical structure being monitored for strain;

FIG. 3 is a graph of the intensity spectrum of the reflected light produced by injecting broadband light into the core of the waveguide with shifts in the spectral lines indicating strain at specific stations.

BEST MODE FOR CARRYING OUT THE INVENTION

Figure 1:
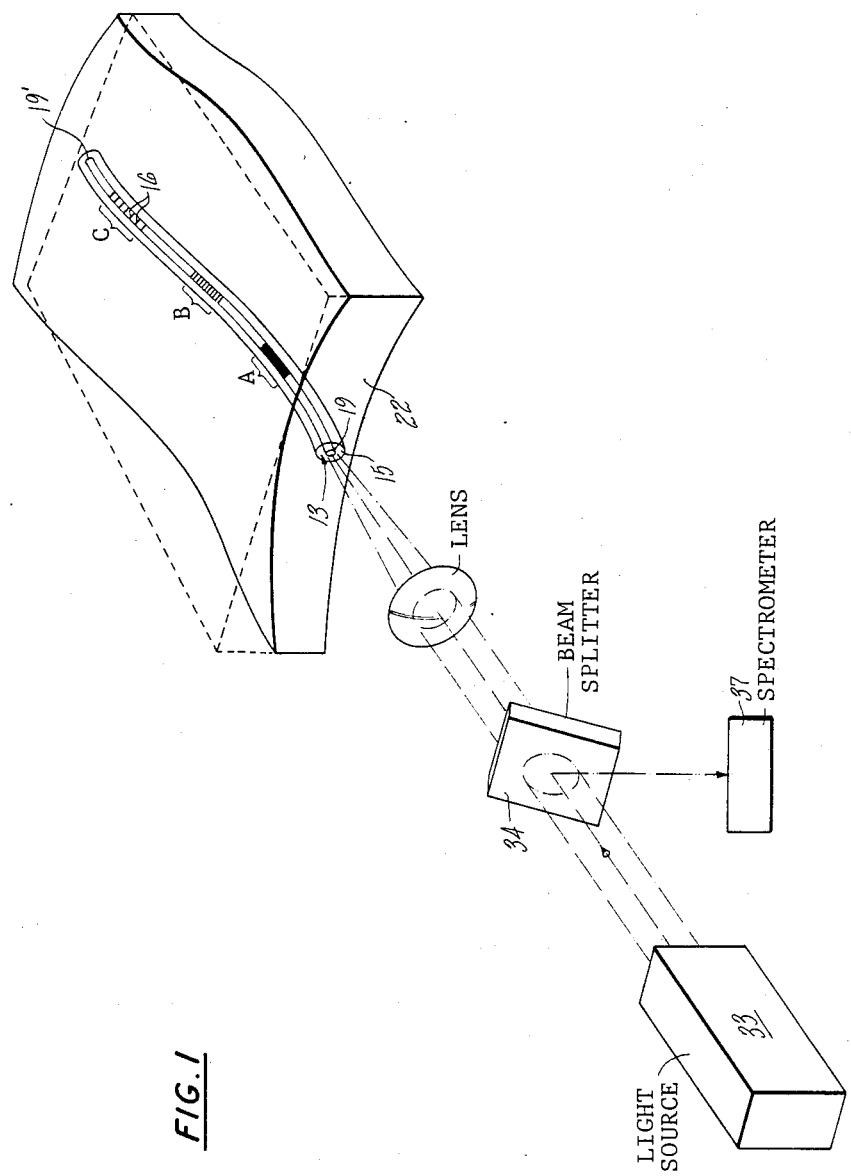
FIG. 1 is a schematic drawing of the spatially resolving optical fiber strain gauge according to the invention addressed herein.

FIG. 1 shows a schematic diagram of the spatially resolving optical fiber strain gauge 13. The gauge 13 includes an optical waveguide 15 or fiber operative to transmit a single or lowest order mode of injected light.

The core 19 of waveguide 15 is preferably a germanium-doped silica or glass filament. The core 15 contains a series of variable spacing Bragg reflection gratings 16 written, impressed or otherwise applied by application of a variable two-beam ultraviolet (less than 300 nanometer) interference pattern. These periodic gratings 16 or refractive index perturbations are permanently induced by exposure to intense radiation.

FIGS. 2A through 2C shows the establishment of different wavelength gratings 16 corresponding to respective locations on core 19.

Each of selected gratings 16 is formed by transverse irradiation with a particular wavelength of light in the ultraviolet absorption band of the core material associated with a position in a structural component 22. This procedure establishes a first order absorption process by which gratings 16 each characterized by a specific spacing and wavelength can be formed by illuminating core 19 from the side with two coplanar, coherent beams incident at selected and complementary angles thereto with respect to the axis of core 19. The grating period is selected by varying the selected angles of incidence. Thus, a permanent change in the refractive index is induced in a predetermined region of core 19, in effect creating a phase grating effective for affecting light in core 19 at selected wavelengths.

As indicated in FIG. 1 the optical waveguide 15 and core 19 are attached or embedded in a section of structural component 22, in particular a plate for example. Core 19 contains characteristic periodic refractive index perturbations or gratings 16 in regions A, B and C thereof. A broadband light source 33 or tunable laser is focused through lens 33' onto the exposed end of core 19. A beam splitter 34 serves to direct the return beam from core 19 toward a suitable readout or spectrometer 37 for analysis. Alternatively, a transmitted beam passing out of the end 19' of core 19 could be analyzed.

The spectrum of the reflected light intensities from strain gauge 13 is shown in FIG. 3. A complementary transmitted spectrum is also established passing out of the end 19' of core 19. The spectrum contains three narrowband output lines centered at respective wavelengths: lambda$_A$, lambda$_B$ and lambda$_C$. These output signals arise by Bragg reflection or diffraction from the phase gratings 16 at respective regions A, B and C. In this example, regions A and C of structural component 22 have been strained by deformation, causing a compression and/or dilation of the periodic perturbations in the fiber core 19.

As a result, the corresponding spectral lines are shifted as shown in FIG. 3 to the dotted lines indicated. The respective wavelength differences delta lambda$_A$ and delta lambda$_C$ are proportional to strain in respective regions A and C.

Figure 4:
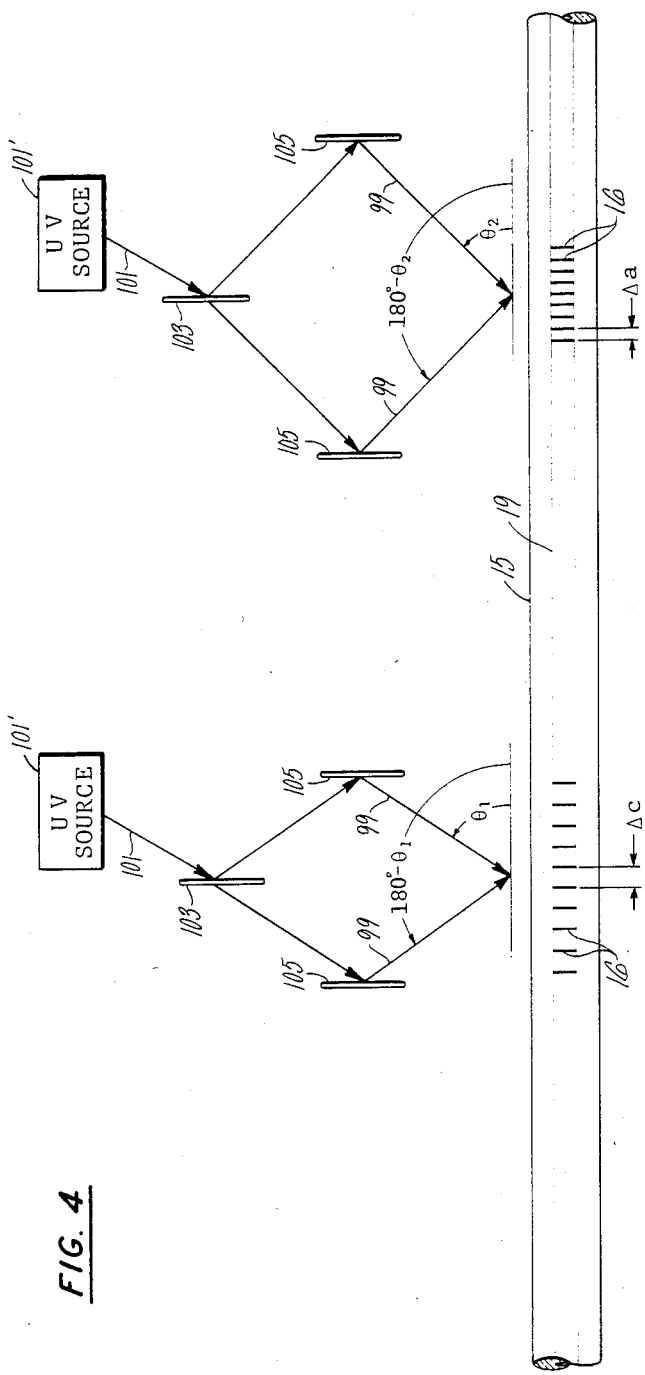
FIG. 4 shows a schematic illustration of a technique for establishing a grating pattern of variable spacing at selected positions along the length of the optical waveguide.

FIG. 4 illustrates the formation of periodic perturbations or gratings 16 in a region of fiber core 19 in response to exposure of core 19 to intense transverse ultraviolet radiation. Grating spacings $\Delta a$ and $\Delta c$ are controlled by the incidence angle of incident interfering beams 99 and beam 101. As can be seen, the angles of incidence of beams 99 are complements (i.e. their sum equals 180 degrees) to each other with respect to the axis of core 19. The incident pair of beams 99 can be derived from a single incident beam 101 passing in part through a beam splitter 103 and reflecting from spaced parallel reflectors 105. By increasing the separation between reflectors 105 and correspondingly varying the angles of incidence of beam 101, the angles of incidence of beams 99 upon core 19 can be controlled. Accordingly, the fringe spacing in grating 16 is varied as desired along the length of core 19, to permit a determination of strain or temperature corresponding to location along gauge 13.

Several spacings can be superimposed or colocated by this technique for the response set forth below.

Sensitivity to external perturbations upon structural component 22 and thus also upon core 19 depends upon the Bragg condition for reflected wavelength. In particular, the fractional change in wavelength due to mechanical strain or temperature change is:

$$d(\lambda_i)/\lambda_i = (q + \alpha)\Delta T + (1 + [\partial n/\partial e]/n)e$$
$$\simeq + 8 \times 10^{-6}/°C.$$
$$+ 8 \times 10^{-7}/\text{microstrain, where:}$$

q is the thermooptic coefficient, which is wavelength dependent;
α is the expansion coefficient;
e is the axial or longitudinal strain;
$\lambda_i$ is the wavelength reflected by the grating at location i along the core 19;
n is the refractive index of the optical waveguide; and
ΔT is the change in temperature.

This relationship suggests a way to compensate for temperature changes along the length of the fiber sensor. In particular, if superimposed gratings of different spacings are provided, each of the two gratings will be subject to the same level of strain, but the fractional change in wavelength of each grating will be different because q is wavelength dependent.

Accordingly, each pair of superimposed gratings will display a corresponding pair of peaks of reflected or transmitted intensity. Accordingly, the shifts of these peaks due to a combination of temperature and strain can be subtracted. The shifts in these peaks due to strain will be the same in magnitude. Accordingly, any remaining shift after subtraction is temperature related. Thus, when it is desired to know the strain difference as between several locations possibly subject to a temperature difference, the temperature factor can be compensated.

The relationship therefore permits compensation for temperature variation during measurement, since the photoelastic and thermoptic effects are wavelength dependent. In other words, by superimposing two or more gratings at each location of interest, two or more spectral lines are established at each point of measurement. Strain will affect both lines equally; temperature will not. Thus, sufficient information is available to permit determination of the magnitude of strain and the temperature difference.

The information above is likely to cause others skilled in the art to conceive of other variations in carrying out the invention addressed herein, which nonetheless are within the scope of the invention. Accordingly, reference to the claims which follow is urged, as those specify with particularly the metes and bounds of the invention.

We claim:

1. An optical fiber having a single core including at least one grating with a predetermined grating spacing permanently provided in at least one grating region of the core by exposing the core to an interference pattern resulting from mutual interference of two beams of ultraviolet radiation simultaneously directed at the fiber at such different acute angles of incidence relative to the longitudinal axis of the core that the interference pattern has fringes situated at said predetermined grating spacing from each other and propagates transversely through the core with attendant permanent change in the index of refraction of the core in correspondence with the interference pattern.

2. The optical fiber according to claim 1, wherein said different acute angles of incidence complement one another to 180° with respect to the longitudinal axis of the core.

3. The optical fiber according to claim 2, wherein the core includes at least one additional grating similar to and provided in the same manner as said one grating but having a predetermined grating spacing different from that of said one grating.

4. The optical fiber according to claim 3, wherein said additional grating is provided at said grating region.

5. The optical fiber according to claim 3, wherein said additional grating is provided in an additional grating region that is longitudinally spaced from said one grating region.

* * * * *

UNITED STATES PATENT AND TRADEMARK OFFICE
CERTIFICATE OF CORRECTION

PATENT NO. : 4,807,950

DATED : February 28, 1989

INVENTOR(S) : William H. Glenn et al

It is certified that error appears in the above-identified patent and that said Letters Patent is hereby corrected as shown below:

On the title page: Item (54) "METHOD FOR IMPRESSING GRATINGS WITHIN FIBER OPTICS" should be

--[54] OPTICAL FIBER WITH IMPRESSED REFLECTION GRATINGS--

Column 1, Lines 1 and 2 "METHOD FOR IMPRESSING GRATINGS WITHIN FIBER OPTICS" should be --OPTICAL FIBER WITH IMPRESSED REFLECTION GRATINGS--

Signed and Sealed this

Tenth Day of March, 1992

Attest:

HARRY F. MANBECK, JR.

Attesting Officer

Commissioner of Patents and Trademarks